Feb. 17, 1970   B. H. SOFFER ET AL   3,496,487
ADDITION OF LASER BEAMS IN MULTIPLE LASER SYSTEMS
Filed July 5, 1966   3 Sheets-Sheet 1

INVENTORS
BERNARD H. SOFFER
BY BILL B. McFARLAND

Elliott & Pastoriza
ATTORNEYS

INVENTORS
BERNARD H. SOFFER
BY BILL B. McFARLAND

*Elliott & Pastoriza*
ATTORNEYS

United States Patent Office 3,496,487
Patented Feb. 17, 1970

3,496,487
ADDITION OF LASER BEAMS IN MULTIPLE LASER SYSTEMS
Bernard H. Soffer, Pacific Palisades, and Bill B. McFarland, Inglewood, Calif., assignors to Union Carbide Corporation, a corporation of New York
Filed July 5, 1966, Ser. No. 562,792
Int. Cl. H01s *3/02*
U.S. Cl. 331—94.5                                    13 Claims

ABSTRACT OF THE DISCLOSURE

A first laser beam is utilized to bleach the dye in a Q-switch incorporated in a second giant pulse laser. By employing optical delay means it is possible to temporally synchronize the first beam with the second beam so that there results two lasers having outputs which are both "locked" in frequency and synchronized in time or phase. The first and second beams may thus be combined to provide a resultant intensified beam wherein the amplitudes of the first and second beams have been directly added together to provide the intensified beam.

---

This invention relates generally to laser systems and more particularly, to combinations of lasers arranged to be triggered through the use of bleachable dyes in their optical cavities, together with other optical components enabling the synchronization of two or more lasers in time and the generation of two or more laser beams of substantially the same frequency.

One type of laser which may be used in the various laser systems of this invention, is described and claimed in co-pending patent application Ser. No. 364,169 filed May, 1, 1964 and entitled Light Control Means For Use With A Giant Pulse Laser. In this laser, a host crystal such as a ruby rod is irradiated with light from a suitable light pump source such as a helical flash lamp surrounding the laser rod. An optical cavity is defined by end mirrors, one of which is partially transparent to pass the laser beam from the system. The optical cavity itself includes a Q spoiling means in the form of a cell containing a reversibly bleachable dye solution. The dye solution is substantially opaque to laser radiation until such time as the intensity of the radiation exceeds a given value. At this point, the dye is bleached so that the cell becomes substantially transparent to restore the Q of the optical cavity and enable generation of a relatively large pulse of radiant energy. The generation of an output beam of radiation can thus be "triggered" by effecting a bleaching of the dye to restore the Q of the optical cavity.

Advantage is taken of the foregoing teachings in the present invention by utilizing the output from one laser to "trigger" or bleach the dye in the dye cell of a second laser thereby triggering operation of the second laser. The bleaching of the dye is effected by the frequency or frequencies of the triggering laser beam. The bleached dye will then favor a particular frequency or frequencies of the various potential frequencies in the second laser beam so that the first and second output beams from the first and second lasers are substantially "locked" in frequency or frequencies.

In the "bleaching" process, there is a delay of the order of 50 nanoseconds. However, by employing suitable optical delay means it is possible to temporally synchronize the first beam with the second beam so that there results two lasers having outputs which are both "locked" in frequency and synchronized in time or phase.

An advantage of the foregoing arrangement is that the first and second output beams may be combined to provide a resultant intensified beam wherein the amplitudes of the first and second beams have been directly added together to provide the intensified beam. An addition of the amplitudes of two or more laser beams cannot ordinarily be realized since, first, the outputs of two independently operated lasers even though of the same host material and same doping ions include more than one frequency and, second, there is no assurance of temporal locking of the beams or effecting their generation in the same time phase.

A better understanding of the present invention as well as various different embodiments in which unique and desirable effects can be achieved will be had by now referring to the accompanying drawings, in which.

Figure 1:
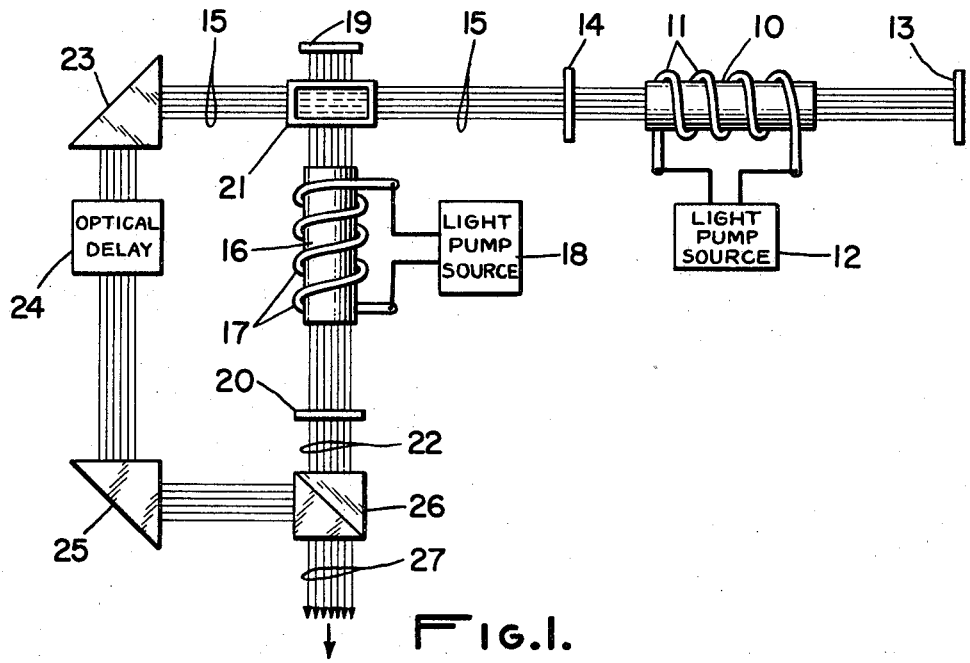
FIGURE 1 illustrates first and second lasers together with laser beam combining means to provide an intensified output beam wherein amplitudes are added.

Referring first to FIGURE 1 there is shown a laser rod 10 which may constitute ruby surrounded by a helical flash lamp 11 powered from a light pump source 12. Suitable end mirrors 13 and 14 are provided in spaced relationship to opposite ends of the laser rod to define an optical cavity. The first mirror 13 is 100% reflecting and the second mirror 14 may be a suitable resonant reflector to constrain the radiation to one frequency or a group of frequencies. The output beam from the optical cavity is illustrated at 15.

As shown in FIGURE 1 there is also provided a second laser including a laser rod 16 surrounded by a helical flash lamp 17 powered from a light pump source 18. This second laser also includes suitable end mirrors 19 and 20 defining an optical cavity which includes a Q spoiling means. This Q spoiling means is in the form of a cell 21 containing reversibly bleachable dye solution. The arrangement is such that when the dye solution in the cell 21 is bleached, a second beam of radiant energy indicated at 22 will pass from the partially reflecting mirror 20 from the second laser optical cavity.

The first and second output beams 15 and 22 are unique in that they are essentially "locked" in frequency or frequencies. Thus, in the operation of the system described thus far, emission of radiation from the first laser rod 10 upon striking the dye cell 21 in the second laser system bleaches the dye to render it transparent thereby restoring the Q of the second laser system so that a second beam of radiant energy is immediately generated. The reversibly bleachable dye favors the particular frequency or frequencies of the first beam and when bleaching, will function in one sense as a filter so that a selected frequency or frequencies of the second generated beam is identical to the triggering frequency of the first laser beam. It is a consequence of this property of the reversibly bleachable dye which enables the provision of first and second output laser beams which are of substantially identical frequencies.

The first and second output beams of radiant energy 15 and 22 may be combined if desired to provide an intensified beam wherein the amplitudes of the first and second beams are added. Towards this end, there is illustrated in FIGURE 1 a prism 23 for reflecting the first beam 15 through an optical delay means designated generally at 24. This delay means may constitute any means for varying the path-length for the beam 15 such as a mirror system or a medium of high index of refraction. The output of the optical delay means in turn passes through a second prism 25 to direct the beam to a beam splitter 26. The beam splitter 26 is employed in a reverse manner from its normal operation. In other words, first and second inputs to the beam splitter function to receive the radiation from first and second sources and combine portions to provide an output in the form of an intensified beam as indicated at 27. In this respect, the beam splitter itself includes a semi-transparent mirror which will reflect a pair of the first beam from prism 25 after passing through the optical delay 24 and transmit a part of the second beam 22 to provide the intensified beam 27.

The optical delay 24 provides a sufficient delay in the arrival time of the first beam 15 in the beam splitter 26 so that it will be in phase or temporally locked with the second beam 22. Thus by such an optical delay which compensates for the small delay involved during the bleaching operation of the dye, the individual amplitudes of the two beams may be added directly to provide the output beam.

Figure 2:
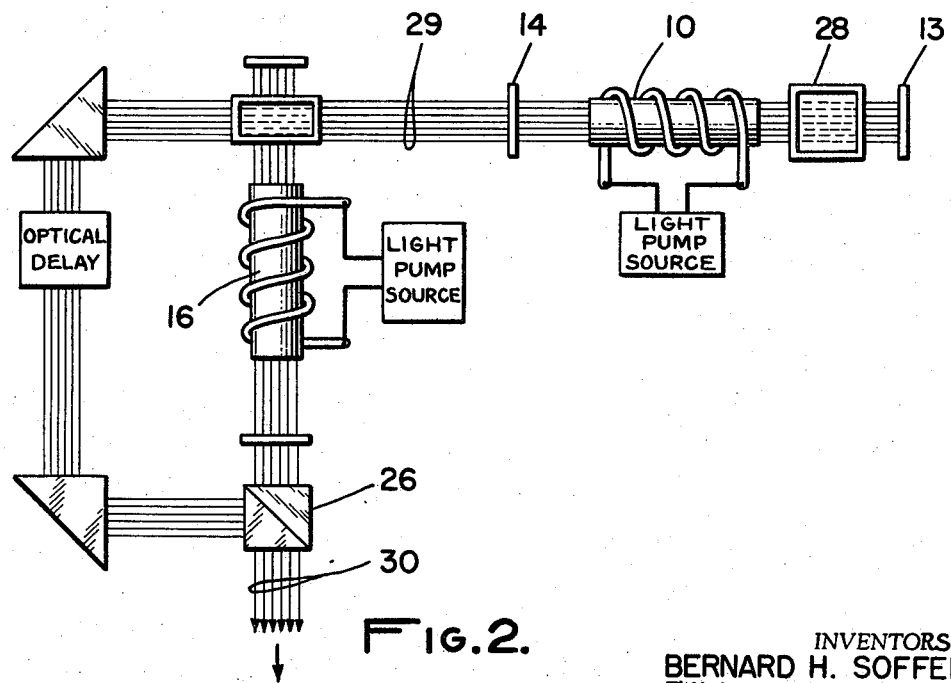
FIGURE 2 illustrates a system similar to FIGURE 1 wherein one of the laser beam generators is modified to constitute a giant pulse laser.

Referring to FIGURE 2, a very similar laser system comprising first and second lasers is illustrated. The only difference in the system of FIGURE 2 is that the first laser system is provided with a Q spoiling means in the form of a dye cell 28 so that a giant laser pulse may be generated in accordance with the teachings of the referred to co-pending application. This giant pulse of radiation is then employed as indicated at 29 to trigger the dye cell in the second laser system.

In FIGURE 2, there is also shown a combining means with a suitable optical delay to provide a giant output intensified beam from the beam splitter 26 as indicated at 30.

Figure 3:
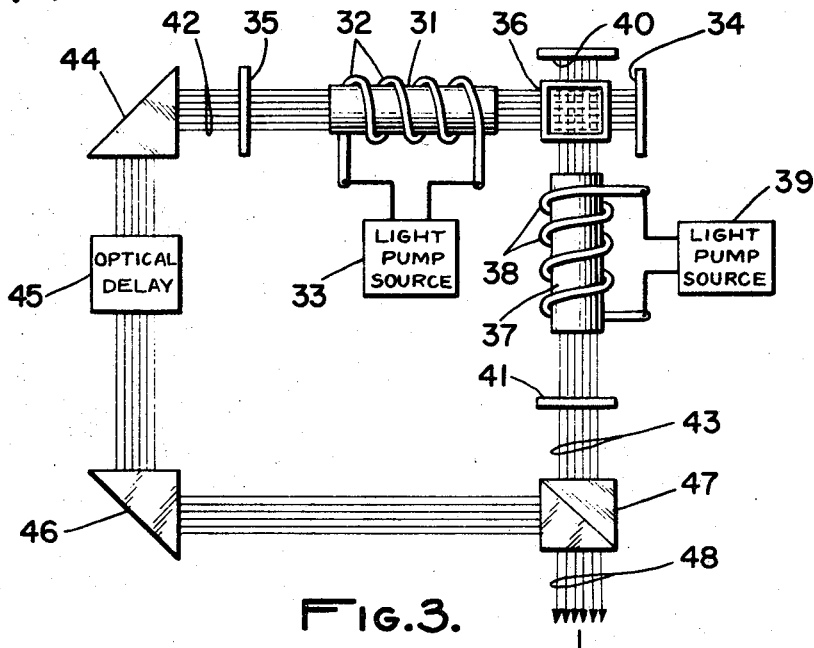
FIGURE 3 illustrates first and second laser systems in which a common Q spoiling means is employed.

Referring now to FIGURE 3 there is shown a laser rod 31 surrounded by a helical flash lamp 32 powered from a light pump source 33. As in the case of the laser system described in FIGURE 1, there are provided end mirrors 34 and 35 defining an optical cavity. A Q spoiling means in the form of a dye cell 36 is disposed in this optical cavity as shown.

This same dye cell 36 is common to the optical cavity of a second laser comprising a laser rod 37 surrounded by a helical flash lamp 38 powered from a light pump source 39. End mirrors 40 and 41 define the optical cavity of the second laser.

In the operation of the system of FIGURE 3, the laser rod 31 may be pumped from the light pump source 33 to a level at which the solution in the dye cell 36 is bleached. Simultaneously, the laser rod 37 is pumped from the light source 39. By varying the relative intensity of the pumping light for the two lasers, one of the lasers may be made to "fire" before the other. For example, if the laser 31 is caused to fire first, the resulting bleaching of the dye in the cell 36 will restore the Q of the second laser optical cavity since this cell is in the optical cavity of the second laser rod so that the second laser will immediately fire.

Another means for initiating the firing of one laser before the other would be to make the dye cell 36 of a rectangular shape such as the dye cell 21 in FIGURE 1 so that it will be bleached by laser radiation passing through the short dimension of the cell before radiation passing through the long dimension.

Again, since a common dye solution is employed which favors a certain frequency of the laser radiation, the output beam 42 of the first laser rod 31 is essentially frequency "locked" to the frequency of the output beam 43 of the second laser rod 37.

Also as in the case of the system of FIGURES 1 and 2, the output beams 42 and 43 may be combined by suitable prism reflectors and optical delay means such as indicated at 44, 45 and 46 for directing the first beam 42 to a beam splitter 47. The resulting output beam is indicated at 48. Again, the time delay 45 will compensate for any delay involved in the triggering of the second laser rod 37 as a consequence of bleaching of the dye cell 36 by radiation from the first laser rod 31 so that the output beams will be temporally locked as well of substantially the same frequency.

Figure 4:
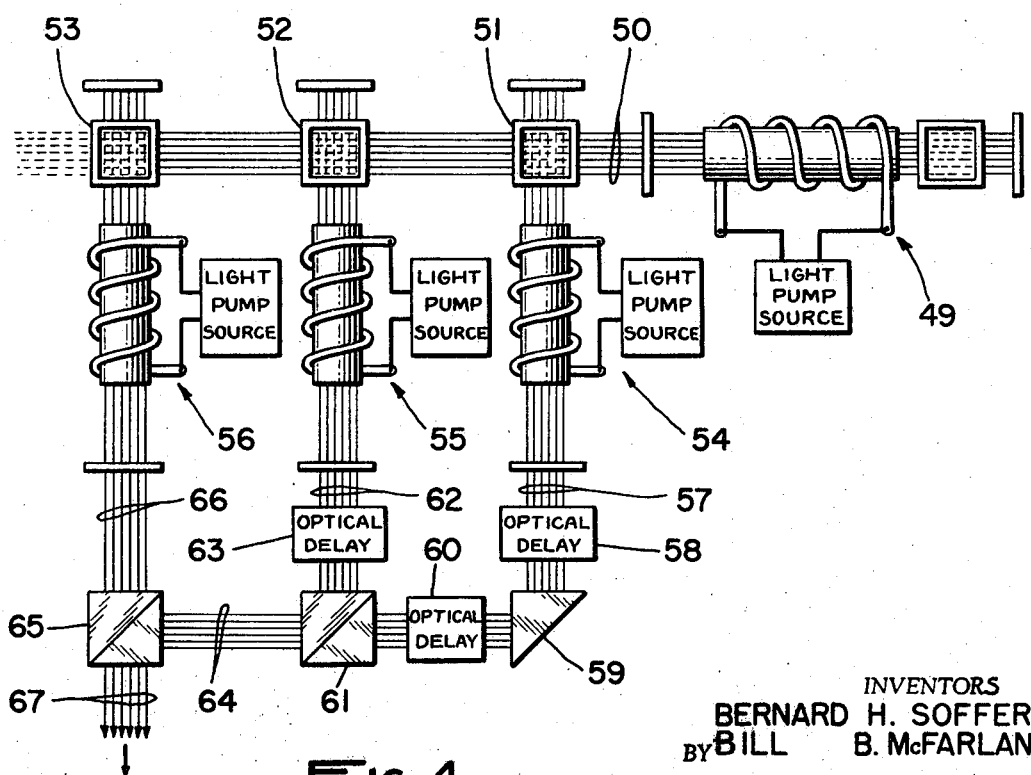
FIGURE 4 shows means for providing a plurality of laser beams by a single triggering laser system together with means for combining the plurality of output beams.

FIGURE 4 illustrates a laser arrangement wherein a first laser indicated generally by the numeral 49 is arranged to generate a first beam 50 of radiant energy which functions to trigger successive dye cells 51, 52 and 53 of a second laser system 54 and additional laser systems 55 and 56. The second output beam of radiant energy is indicated at 57. This output beam may be passed through an optical delay 58, a right angle prism 59 and second optical delay 60 to a first beam splitter 61. The output beam from a first additional laser such as the laser 55 is indicated at 62 and is passed through an optical delay 63 into the beam splitter 61. A combined beam 64 results which is then passed to a beam splitter 65. This beam splitter 65 also receives a second additional laser output beam 66 to provide a combined beam as at 67.

The irradiation of the dye cells 51, 52 and 53 by the first laser beam 50 takes place substantially simultaneously so that both frequency locking and temporal locking can be provided without the time delays 58, 60 and 63. However these optical time delays are illustrated so that adjustments could be made if desired.

The output beam 67 from the second beam splitter 65 will have an amplitude greater than the amplitude of the combined beam 64 or the beam 66 and the combined beam 64 in turn will have an amplitude greater than the amplitude of either the beam 62 or the beam 57.

Figure 5:
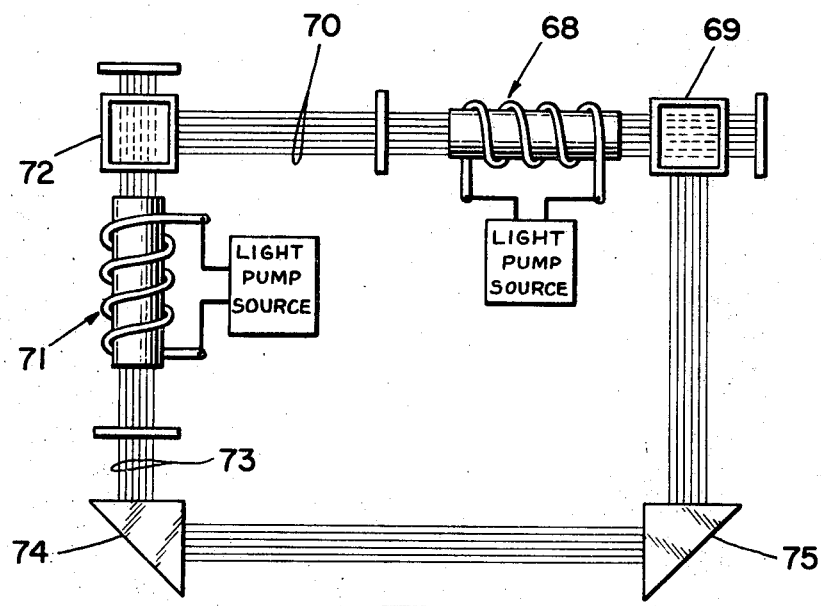
FIGURE 5 illustrates a closed loop laser system employing first and second lasers in which a first laser triggers the generation of a beam of radiant energy by the second laser and this beam in turn is employed to again trigger the first laser; and, FIGURE 6 illustrates a closed loop laser system including a plurality of individual lasers arranged for sequential triggering in a closed loop.

FIGURE 5 illustrates a unique laser system involving first and second lasers wherein a closed loop arrangement is provided. Thus as shown, there is provided a first laser system 68 incorporating a reversibly bleachable dye cell 69 in its optical cavity. When the laser 68 is triggered to fire, there results an output beam 70. This beam 70 serves to trigger a second laser designated generally by the numeral 71 by bleaching the solution in a Q spoiling cell 72 in the optical cavity of the laser 71. The second beam of radiation 73 from the second laser 71 is passed through right angle prisms 74 and 75 to be directed back to the dye cell 69.

In the foregoing arrangement, if the laser systems 68 and 71 can be pumped continuously up to a point where they are almost ready to fire, it will be evident that once one of the lasers has fired, it will trigger the firing of the other laser which in turn will again fire the first laser, and so forth. The result is an automatic and rapid triggering of lasers wherein a pulse repetition rate is determined by the transit time of the light about the closed loop together with the bleaching time of the respective Q spoiler cells.

Figure 6:
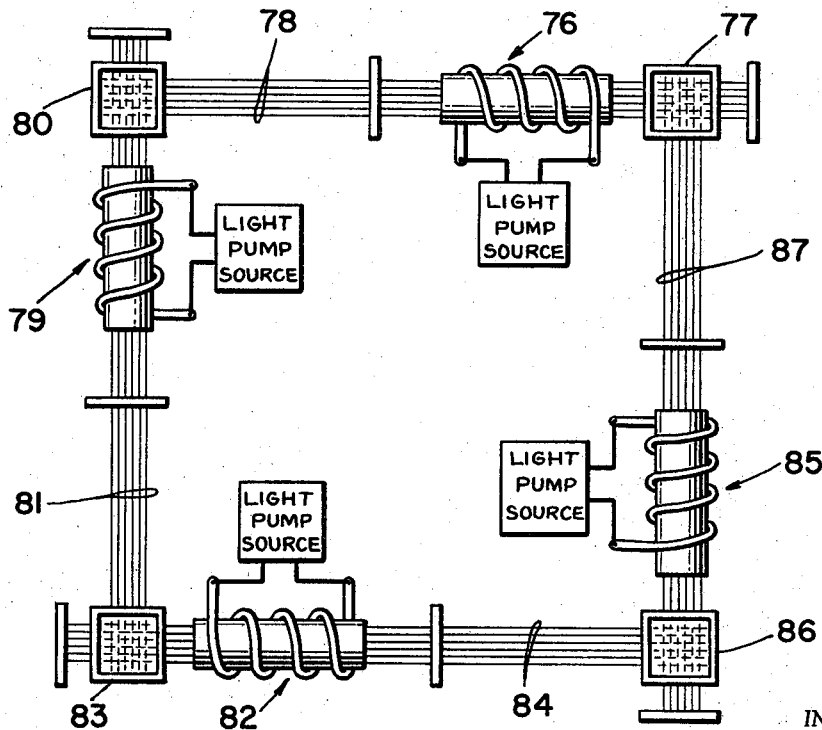

Referring now to FIGURE 6 there is shown a system similar to that of FIGURE 5 but employing additional lasers to provide a closed loop system. Thus, a first laser 76 is provided with a Q spoiling means in the form of a dye cell 77 for generating a first beam of radiant energy 78. This beam in turn triggers operation of a second laser 79 by bleaching a reversibly bleachable dye in the dye cell 80 for the second laser to result in the generation of a second laser beam 81. The laser beam 81 in turn triggers operation of a first additional laser 82 by bleaching the dye in its optical cavity dye cell 83 to result in a third laser beam 84. This laser beam 84 then triggers operation of a second additional laser 85 by bleaching the dye in its optical cavity dye cell 86 to provide a fourth laser beam 87. In the embodiment illustrated in FIGURE 6, this last laser beam 87 is directed at the first dye cell 77 for the first laser 76.

With the foregoing arrangement, there is provided a closed network of lasers wherein each triggers operation of the next successive laser to provide a closed loop. Again as in the case of FIGURE 5, each of the laser rods are pumped up continuously to a level at which they are almost ready to fire so that the time to ready their lasers by light pumping is minimized in each system. The actual firing is effected upon bleaching of the dye by the preceding laser beam. It will be understood that additional lasers may be included in the closed circuit.

In actual experiments with a ruby laser, best results have been obtained with phthalocyanine dyes, although cryptocyanine will work. More particularly, sulfonated forms of phthalocyanine dyes which are soluble in water and methanol are found to be the most desirable types of reversibly bleachable dyes. These dyes are advantageous because of their relative ease of bleaching. Further, troubles resulting from stimulated Raman and Brillouin effects brought about by the use of organic solvents commonly and necessarily used to dissolve unsulfonated phthalocyanine dyes, are avoided.

Two examples of particular dyes employed with a ruby laser were, first, a sulfonated metal free phthalocyanine dissolved in methanol with a small quantity of water, and, second, a triphenyl guanidinium base salt of metal free phthalocyanine. For other lasers, such as a neodymium laser, other dyes would be used. In this respect, it would be preferable to use a low threshhold laser such as a neodymium laser in the embodiments of FIGURES 5 and 6 to minimize the pumping energy in placing the lasers in condition for firing.

From the foregoing description, it will be evident that the various techniques described allow frequency locking of two or more lasers. This feature together with the beam combining means as described enables larger brightness to be realized than is the case by merely adding the intensity of two or more independent lasers. This is because the frequency locking allows coherent addition of amplitudes. The temporal locking effected by means of the delay lines allows exact phase synchronization to be achieved.

While only certain laser configurations have been set forth and described, other arrangements falling within the scope and spirit of this invention will occur to those skilled in the art. The multiple laser systems are therefore not to be thought of as limited to the particular embodiments set forth merely for illustrative purposes.

What is claimed is:

1. A laser system including: a first laser for providing a first beam of radiant energy along a given path; a second laser having Q spoiling means in its optical cavity, said Q spoiling means being positioned in said given path and being responsive to said first beam of radiant energy of said first laser to restore the Q of said optical cavity of said second laser and thereby trigger the generation of a second beam of radiant energy by said second laser; and means positioned for intercepting and combining said first beam of radiant energy and said second beam of radiant energy to provide an intensified beam of radiant energy.

2. A system according to claim 1, in which said first laser includes Q spoiling means in its optical cavity for enabling the generation of giant laser pulses so that said first beam of radiant energy is defined by a giant pulse of radiant energy.

3. A system according to claim 1, in which said Q spoiling means is common to the optical cavities of said first and second lasers.

4. A laser system including a first laser for providing a beam of radiant energy along a given path; a second laser having Q spoiling means in its optical cavity, said Q spoiling means being positioned in said given path and being responsive to said first beam of radiant energy of said first laser to restore the Q of said optical cavity of said second laser and thereby trigger the generation of a second beam of radiant energy by said second laser; additional lasers having Q spoiling means in their optical cavities respectively, said additional lasers being positioned in said given path such that their Q spoiling means are triggered by said first beam of radiant energy to provide additional beams of radiant energy, and means for intercepting and combining said second beam of radiant energy with said additional beams of radiant energy to provide an overall intensified beam of radiant energy.

5. A laser system including: a first laser for providing a first beam of radiant energy along a given path; a second laser having Q spoiling means in its optical cavity, said Q spoiling means being positioned in said given path and being responsive to said first beam of radiant energy of said first laser to restore the Q of said optical cavity of said second laser and thereby trigger the generation of a second beam of radiant energy by said second laser, said first laser including Q spoiling means in its optical cavity; and means for directing said second beam of radiant energy to irradiate said Q spoiling means in said first laser to trigger generation of said beam of radiant energy thereby providing a closed loop laser system.

6. A laser system including: a first laser for providing a first beam of radiant energy along a given path; a second laser having Q spoiling means in its optical cavity, said Q spoiling means being positioned in said given path and being responsive to said first beam of radiant energy of said first laser to restore the Q of said optical cavity of said second laser and thereby trigger the generation of a second beam of radiant energy by said second laser; and additional lasers having Q spoiling means in their optical cavities, respectively, a first one of said additional lasers being positioned such that its Q spoiling means intercepts said second beam of radiant energy to thereby trigger the generation of a third beam of radiant energy; a second one of said additional lasers being positioned such that its Q spoiling means intercepts said third beam of radiant energy to thereby trigger the generation of a fourth beam of radiant energy, said first laser including Q spoiling means positioned to intercept the last of the generated laser beams of said additional lasers to thereby trigger generation of said first beam of radiant energy, whereby a closed loop of a plurality of lasers is provided.

7. A system according to claim 1, in which said Q spoiling means comprises a cell containing a reversibly bleachable dye solution.

8. A system according to claim 7, in which said first and second lasers are ruby and in which said reversibly bleachable dye solution comprises at least one sulfonated metal free phthalocyanine dye dissolved in methanol with a small quantity of water.

9. A system according to claim 7, in which said first and second lasers are ruby and in which said reversibly bleachable dye solution includes a triphenyl guanidinium base salt of metal free phthalocyanine.

10. A system according to claim 1, in which said means for intercepting and combining said first beam of radiant energy and said second beam of radiant energy includes: an optical delay means disposed in said given path of said first beam of radiant energy after it has triggered the generation of said second beam of radiant energy; and a beam combiner including a semi-transparent mirror positioned to receive said first beam after passing through said optical delay means and second beam, to provide said intensified beam in the form of an output beam of amplitude greater than the amplitude of either one of said first or second beams.

11. A system according to claim 4 in which said means for combining said second beam of radiant energy with said additional beams of radiant energy includes: optical delay means in the paths of said second beam of radiant energy and in the path of at least one of said additional beams of radiant energy; and first beam combining means including a semi-transparent mirror positioned to receive said second and one additional beam of radiant energy after passing through said optical delay means for providing a combined beam; and second beam combining means including a semi-transparent mirror positioned to receive said combined beam and a second one of said aditional beams for providing an output beam.

12. A system according to claim 1, in which said first and second beams are locked at substantially the same frequencies.

13. A system according to claim 10, in which said first and second beams are locked in frequency and temporally locked in phase when received in said beam splitter.

References Cited

UNITED STATES PATENTS

| | | | |
|---|---|---|---|
| 3,270,291 | 8/1966 | Kosonocky | 331—94.5 |
| 3,289,099 | 11/1966 | Masters | 331—94.5 |
| 3,289,101 | 11/1966 | Masters et al. | 331—94.5 |
| 3,361,988 | 1/1968 | Chynoweth | 331—94.5 |

OTHER REFERENCES

"Ruby Laser Q-Switching Elements Using Phthalocyanine Molecules in Solution," P. Sorokin et al., IBM J., Apr. 8, 1964, pp. 182–4.

"Progress in Optical Computer Research," O. Reimann et al., IEEE Spectrum, March 1965, pp. 181–95.

"Self Mode Locking of Lasers With Saturable Absorbers," A. DeMaria et al., App. Phys. Lett., 8 (7) Apr. 1, 1966, pp. 174–6.

"Simultaneous Giant Pulses From Five Ruby Laser Oscillators," D. Gregg et al., J. App. Phys., 37 (10), September 1966, pp. 3750–3.

"AND Device Using Two Lasers and a Bleachable Absorber," A. B. Fowler, IBM Tech. Discl. Bul., 7 (6), November 1964, p. 544.

DONALD L. WIBERT, Primary Examiner

R. J. WEBSTER, Assistant Examiner